Figure 1:
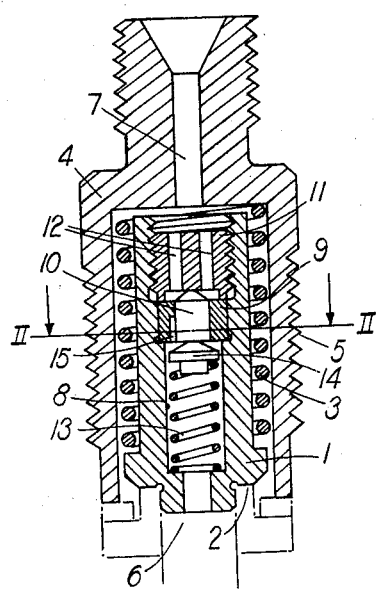

Oct. 31, 1933.  A. A. SIDNEY  1,933,454

DELIVERY VALVE OF RECIPROCATING PUMPS

Filed May 6, 1933

INVENTOR
Arthur A. Sidney
BY
ATTORNEY

Patented Oct. 31, 1933

1,933,454

UNITED STATES PATENT OFFICE 1,933,454

DELIVERY VALVE OF RECIPROCATING PUMPS

Arthur Alexander Sidney, Thornton Heath, England

Application May 6, 1933, Serial No. 669,780, and in Great Britain April 12, 1932

2 Claims. (Cl. 277—45)

The invention relates to delivery valve apparatus for use in conjunction with fluid pumps of the reciprocating piston or plunger type, such for instance, as liquid fuel pumps commonly used for injecting fuel into the working cylinder or cylinders of internal combustion engines.

In fuel injection apparatus for internal combustion engines in which the motive fluid is injected under considerable pressure by fuel delivery pumps of the reciprocating plunger type, it is desirable that on the completion of each injection stroke by the pump plunger, the injection pressure of the fluid in the entire injection circuit should drop instantaneously to substantially atmospheric pressure. Accordingly the invention has for its object to provide means in the delivery valve apparatus of reciprocating pumps whereby the fluid pressure obtaining in the portion of the injection system between the pump chamber and the engine cylinder may rapidly be reduced to substantially atmospheric pressure on the completion of each delivery stroke of the pump, so as to prevent the pressure in the pipe line or other portion of the system between the pump chamber and the engine cylinder from exceeding the pressure to which the injector is loaded.

According to the invention a delivery valve for pumps of the reciprocating plunger type is combined with a secondary or relief valve which communicates at its inlet side with the outlet side of the delivery valve, and at its outlet side with the inlet side of the delivery valve, whereby said secondary valve is opened by the fluid on the outlet side of the delivery valve when the pressure thereof attains a predetermined value.

In carrying out the invention, the delivery valve and the relief valve may be oppositely biased to their closed positions. Conveniently, the delivery valve and the relief valve are operatively associated within a common housing.

A preferred form of apparatus comprises a poppet delivery valve and a piston type relief valve slidably arranged within the moving member of the poppet valve, the relief valve being conveniently biased to its closed position by a helical spring interposed between said valve and a seating formed within the poppet valve.

Conveniently the piston relief valve may operate in a cylindrical member disposed within an axial bore of the poppet delivery valve, and said cylindrical member may be provided with internal recesses or grooves terminating at one end within the cylindrical member and communicating at the other end through the bore in the poppet valve with the inlet face of this valve. The cylindrical member for the piston relief valve may be retained in position in the bore of the poppet delivery valve by a threaded plug having one or more passageways extending therethrough, said plug being screwed into the upper part of said bore, and serving as an abutment for the piston valve.

The invention is illustrated by way of example in the accompanying drawing, which shows a preferred form of delivery valve apparatus according to the invention for use in conjunction with a fuel injection pump for internal combustion engines.

Figure 2:
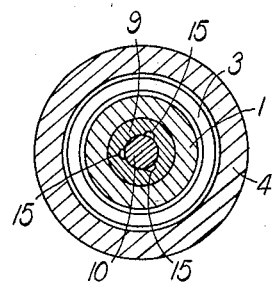

In the drawing, Fig. 1 is a sectional elevation through the delivery valve, and Fig. 2 is a sectional plan view of the valve taken on the line II—II of Fig. 1.

Referring to the drawing, the main delivery valve 1 for the pump is biassed on to its seating 2 by means of a helical spring 3, which bears at its upper end against the interior of a housing 4, which is screw-threaded externally, as shown at 5, whereby it may be attached to the upper end of a fuel delivery pump, the top of the fuel chamber of which is denoted at 6. The delivery valve 1 has an axial bore 8 communicating at its lower end with the fuel chamber 6 of the pump, and at its other end with the fuel outlet 7 to the engine. Within the axial bore 8 is disposed a cylindrical member 9 within which is slidably disposed a short piston 10. The member 9 rests at its lower end on an abutment within the bore 8 and is retained against axial movement by a threaded plug 11, which is screwed into the internally threaded upper portion of the bore 8. The plug 11 is provided with a plurality of longitudinal bores 12, two of which are shown. The piston 10 is formed at its upper end with a tapered portion which abuts, in the upper position of the piston, against the central portion of the lower face of the plug 11. The piston 10 is biassed to this position by a helical spring 13 disposed within the bore 8 and bearing at its lower end on a seating conveniently provided by a reduced portion of the bore at the lower end of the valve 1. The spring bears at its upper end on the piston 10 through the medium of a small plug 14. In the interior surface of the member 9 are cut three longitudinal grooves or recesses 15 extending to a substantial distance from the lower face of the member, and the helical spring 13 is arranged so that when compressed to its maximum extent, the upper end of the piston 10 is still contained within the bore of the member 9, but the upper edge thereof is located below the upper end of the grooves or recesses 15. Thus it will be seen that when the piston 10 is in this position, a free passageway between the pump outlet 7 and the pump chamber 6 is provided by way of the bores 12 and 8 and the grooves 15.

In operation, when the pump plunger moves to discharge fluid from the pump, the valve 1 is raised from its seat 2 carrying with it the piston valve 10, which is biassed to close the outlet grooves 15 by the combined pressure due to the spring 13 and the fluid pressure of the fuel being delivered from the pump so that fuel from the pump passes to the pipe line. When the pressure in the pump chamber 6 drops due to the delivery from the pump being cut off, the valve 1 returns to its seat 2 under the influence of the helical spring 3 and the fluid pressure within the pipe line. In the event that the pressure in the pipe line reaches a value in excess of the biassing force exerted by the helical spring 13, due for instance to constrictions in the pipe line or other causes, the piston valve 10 will be forced against the biassing action of the spring 13 until the upper ends of the grooves 15 are uncovered, whereupon the fuel can flow from the pipe line to the pump chamber 6—which is now at atmospheric pressure—until the pressure in the pipe line also attains atmospheric value.

It will thus be seen that the invention provides delivery valve apparatus for use in conjunction with reciprocating pumps, more particularly fuel pumps for internal combustion engines, in which the fluid pressure in the injection system can be maintained at all times at less than a predetermined safe value.

It will be evident that the arrangement hereinbefore described by way of example may be modified within the scope of the invention.

I claim:—

1. Delivery valve apparatus comprising a housing having a seating adjacent its lower end, a centrally bored poppet type delivery valve disposed within said housing and biassed toward said seating, the bore of said delivery valve having a shoulder adjacent its lower end and an abutment between its ends, a hollow cylindrical member in said bore and bearing against said abutment, said member having internal recesses therein each of which terminates at one end within the cylindrical member and communicates at the other end with the bore in the poppet valve, a threaded plug in the bore of said delivery valve and retaining said cylindrical member against axial movement, said threaded plug having passageways therein, a piston member slidable in said hollow cylindrical member and abutting at its upper end against said threaded plug, and a helical spring in the bore of said delivery valve between said shoulder and the lower end of the piston member.

2. Delivery valve apparatus, comprising a housing, a seat within said housing, a poppet valve within said housing and biassed downwardly on to said seat, said poppet valve having a central bore, a hollow member secured within the bore of said poppet valve and having grooves in its inner surface, said grooves extending from points spaced below the upper end of said hollow member through the lower end of said hollow member, a piston slidable in said hollow member to cover and uncover said grooves, and means yieldingly holding said piston in position to cover said grooves.

ARTHUR ALEXANDER SIDNEY.